(12) United States Patent
Fu et al.

(10) Patent No.: US 12,332,555 B2
(45) Date of Patent: Jun. 17, 2025

(54) OPTICAL ENGINE MODULE FOR DISSIPATING HEAT GENERATED BY OFF-STATE BEAM AND PROJECTION DEVICE USING THE SAME

(71) Applicant: Coretronic Corporation, Hsin-Chu (TW)

(72) Inventors: Mao-Min Fu, Hsin-Chu (TW); Chien-Ming Peng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/233,564

(22) Filed: Apr. 19, 2021

(65) Prior Publication Data

US 2022/0291575 A1  Sep. 15, 2022

(30) Foreign Application Priority Data

Mar. 12, 2021  (TW) .................................. 110108804

(51) Int. Cl.
*G03B 21/16* (2006.01)
*G03B 21/14* (2006.01)
*G03B 21/28* (2006.01)

(52) U.S. Cl.
CPC ........... *G03B 21/16* (2013.01); *G03B 21/145* (2013.01); *G03B 21/28* (2013.01)

(58) Field of Classification Search
CPC ...... G03B 21/16; G03B 21/145; G03B 21/28; G03B 21/2066; H04N 9/3144
See application file for complete search history.

(56) References Cited

U.S. PATENT DOCUMENTS

| 6,179,424 | B1* | 1/2001 | Sawamura | G02B 26/0841 348/771 |
| 7,708,412 | B2* | 5/2010 | Lee | G02B 26/0833 353/81 |
| 8,342,690 | B2 | 1/2013 | Coleman et al. | |
| 2002/0033992 | A1* | 3/2002 | Den Bossche | G03B 33/12 359/291 |
| 2007/0035701 | A1* | 2/2007 | Lee | H04N 9/3114 353/97 |
| 2018/0020196 | A1* | 1/2018 | Terada | G03B 21/2066 |

(Continued)

FOREIGN PATENT DOCUMENTS

| CN | 1588227 A | 3/2005 |
| CN | 102508402 A * | 6/2012 |

(Continued)

*Primary Examiner* — Bao-Luan Q Le

(57) ABSTRACT

An optical engine module used in a projection device and configured to generate an image beam includes a housing and a plate. The housing has a surrounding side wall and a bottom wall connected to each other. The bottom wall has a first opening. The surrounding side wall has an off-state beam irradiation zone adjacent to the first opening. The first opening is configured to allow the image beam to exit. The off-state beam irradiation zone is configured to be irradiated by an off-state beam. The plate has a light receiving part and a heat dissipating part. The light receiving part is disposed in the off-state beam irradiation zone. The heat dissipating part passes through the bottom wall and extends out of the housing. A projection device adopting the optical engine module is also provided.

14 Claims, 6 Drawing Sheets

(56) References Cited

U.S. PATENT DOCUMENTS

| | | | | |
|---|---|---|---|---|
| 2018/0239225 A1* | 8/2018 | Zhong | ................ | G02B 26/0833 |
| 2018/0275497 A1* | 9/2018 | Kase | ...................... | G02B 5/003 |
| 2019/0094675 A1* | 3/2019 | Terada | ............... | G03B 21/2066 |
| 2019/0364250 A1* | 11/2019 | Malfait | .................. | G02B 7/008 |
| 2021/0124245 A1* | 4/2021 | Tsai | ..................... | G03B 21/008 |
| 2021/0286239 A1* | 9/2021 | Fu | ........................ | G03B 21/142 |

FOREIGN PATENT DOCUMENTS

| | | | | | |
|---|---|---|---|---|---|
| CN | 206573842 U | | 10/2017 | | |
| CN | 206819032 U | | 12/2017 | | |
| CN | 111198474 A | | 5/2020 | | |
| CN | 210954580 U | | 7/2020 | | |
| CN | 211741813 U | | 10/2020 | | |
| CN | 112433423 A | | 3/2021 | | |
| CN | 113296228 A | * | 8/2021 | ............. | G02B 7/181 |
| CN | 214375779 U | * | 10/2021 | | |
| TW | 201821895 A | | 6/2018 | | |
| TW | I709810 B | | 11/2020 | | |

\* cited by examiner

OPTICAL ENGINE MODULE FOR DISSIPATING HEAT GENERATED BY OFF-STATE BEAM AND PROJECTION DEVICE USING THE SAME

CROSS-REFERENCE TO RELATED APPLICATION

This application claims the priority benefit of Taiwan application (110108804), filed on Mar. 12, 2021. The entirety of the above-mentioned patent application is hereby incorporated by reference herein and made a part of this specification.

FIELD OF THE INVENTION

The invention relates to an optical module, and particularly to an optical engine module and a projection device adopting the optical engine module.

BACKGROUND OF THE INVENTION

The projector is usually equipped with a light source, a plurality of optical elements, a light valve and a projection lens. The optical elements include a lens, a prism, etc. In detail, the light source provides an illumination beam. The light valve converts the illumination beam into an image beam when the light valve is in an on-state. The optical elements direct the illumination beam to the light valve and the image beam to the projection lens. Then, the image beam is emitted from the projection lens. On the other hand, the light valve directs beams to a position deviated from the projection lens to generate the off-state beams when the light valve is in an off-state. The off-state beam may stay in the housing of the projector, causing the internal temperature of the projector to rise, affecting the service life of the optical components or other components, and thus reducing the reliability of the projector.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

An embodiment of the invention provides an optical engine module, which has the advantage of improved heat dissipation.

An embodiment of invention provides a projection device, which has improved reliability.

Other advantages and aspects of the invention may be further illustrated by the technical features broadly embodied and described as follows.

In order to achieve one or part or all of the above-mentioned purposes or other purposes, the optical engine module used in a projection device and configured to generate an image beam provided by the invention includes a housing and a plate. The housing has a surrounding side wall and a bottom wall connected to each other. The bottom wall has a first opening. The surrounding side wall has an off-state beam irradiation zone adjacent to the first opening. The first opening is configured to allow the image beam to exit. The off-state beam irradiation zone is configured to be irradiated by an off-state beam. The plate has a light receiving part and a heat dissipating part. The light receiving part is disposed in the off-state beam irradiation zone. The heat dissipating part passes through the bottom wall and extends out of the housing.

In an embodiment of the invention, the heat dissipating part includes a heat dissipation plate or a plurality of heat dissipation bars.

In an embodiment of the invention, the heat dissipating part extends in a direction away from the bottom wall.

In an embodiment of the invention, a width of an end of the heat dissipating part far away from the bottom wall is greater than or less than a width of an end of the heat dissipating part close to the bottom wall.

In an embodiment of the invention, the optical engine module further includes an optical prism. The surrounding side wall further has a second opening. The optical prism has a first surface and a second surface connected to each other. The first surface faces to the first opening. The second surface faces to the second opening. The light receiving part and the optical prism are separated from each other.

In an embodiment of the invention, the optical engine module further includes a light valve disposed at the second opening of the housing.

In an embodiment of the invention, the optical engine module further includes a dust-proof member. The bottom wall has a slit for allowing the heat dissipating part to pass therethrough. The dust-proof member is disposed between the slit and the heat dissipating part.

In an embodiment of the invention, the plate further includes a fixing part connecting the light receiving part and the heat dissipating part. The fixing part is fixed on the bottom wall.

The projection device provided by the invention includes a light source, the aforementioned optical engine module and a projection lens. The light source is configured to provide an illumination beam. The optical engine module is disposed on a transmission path of the illumination beam and configured to generate an image beam. The projection lens is disposed on a transmission path of the image beam and configured to project the image beam. The first opening of the bottom wall of the housing of the optical engine module is configured to allow the image beam to exit. The projection lens is configured to receive the image beam from the first opening. The light source is configured to provide the illumination beam into the housing.

The optical engine module of the invention adopts a plate having a light receiving part and a heat dissipating part. The light receiving part is located in the housing of the optical engine module and for allowing the off-state beam to irradiate thereon, and the heat dissipating part extends out of the housing. In this way, the heat accumulated in the light receiving part can be dissipated out of the housing through the heat dissipating part, thereby improving the heat dissipation efficiency of the optical engine module. On the other hand, the projection device of the invention has improved reliability due to adopting the aforementioned optical engine module.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
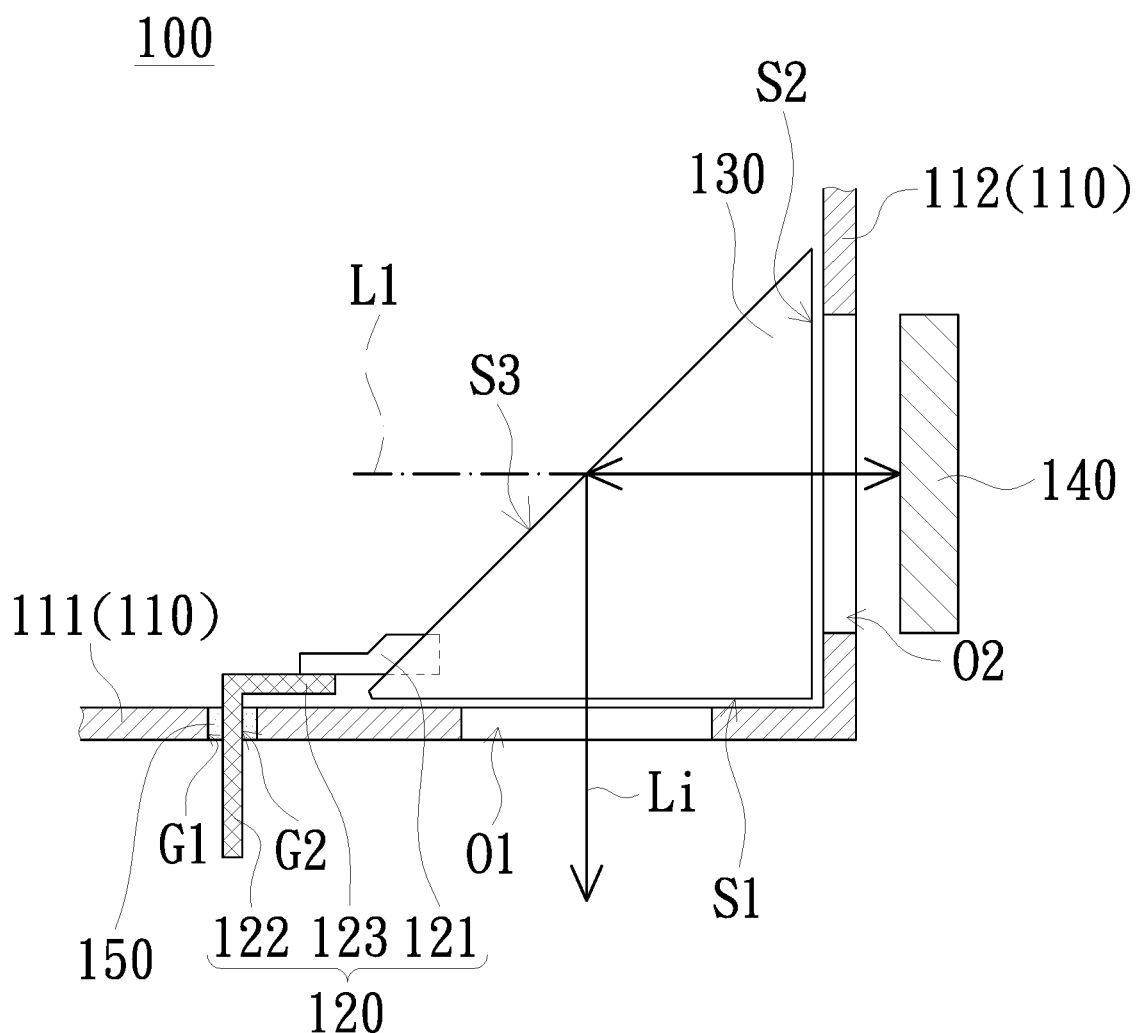
FIG. 1 is a schematic cross-sectional view of an optical engine module according to an embodiment of the invention.
Figure 2:
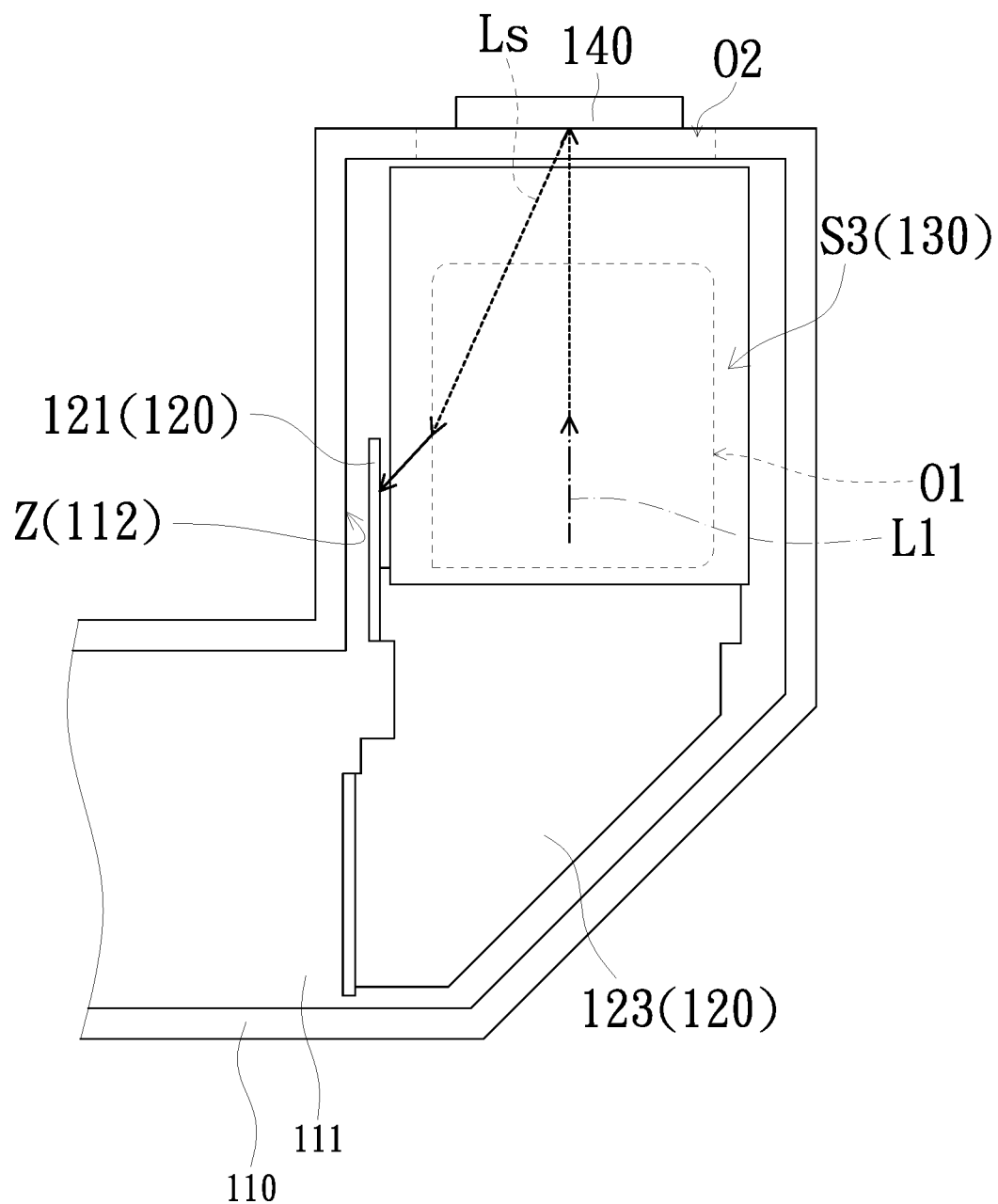
FIG. 2 is a schematic top view of the inside of the housing of the optical engine module of FIG. 1.

FIG. 1 is a schematic cross-sectional view of an optical engine module according to an embodiment of the invention. FIG. 2 is a schematic top view of the inside of the housing of the optical engine module of FIG. 1. Please refer to FIGS. 1 and 2. The optical engine module 100 is, for example, used for a projection device and is configured to generate an image beam Li. The optical engine module 100 includes a housing 110 and a plate 120. The housing 110 has a bottom wall 111 and a surrounding side wall 112 connected to each other. The bottom wall 111 has a first opening O1, and the surrounding side wall 112 has an off-state beam irradiation zone Z adjacent to the first opening O1. The first opening O1 is configured to allow the image beam Li to exit. The off-state beam irradiation zone Z is configured to be irradiated by an off-state beam Ls. The plate 120 has a light receiving part 121 and a heat dissipating part 122. The light receiving part 121 is disposed in the off-state beam irradiation zone Z. The heat dissipating part 122 passes through the bottom wall 111 and extends out of the housing 110.

Figure 3:
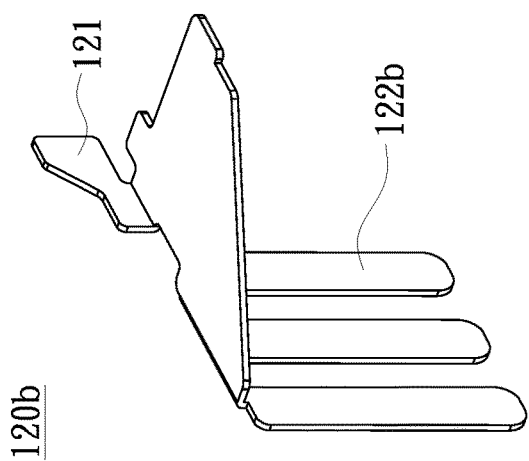
FIG. 3 is a schematic three-dimensional diagram of the plate in FIG. 1.

FIG. 3 is a schematic three-dimensional diagram of the plate in FIG. 1. Please refer to FIGS. 1, 2 and 3 together. The material of the plate 120 may include metal, such as aluminum. In detail, the plate 120 of this embodiment may further include a fixing part 123. The fixing part 123 connects the light receiving part 121 and the heat dissipating part 122. The light receiving part 121, the heat dissipating part 122 and the fixing part 123 may be integrally formed, but the scope of the invention is not limited thereto. The fixing part 123 is fixed on the bottom wall 111. For example, the fixing part 123 may be fixed on the bottom wall 111 in a manner of locking, pasting or hot melting, but the invention does not limit the specific fixing method.

Please continue to refer to FIG. 1. The heat dissipating part 122 extends, for example, in a direction away from the bottom wall 111 to increase a heat dissipation area of the heat dissipating part 122. In detail, the bottom wall 111 of the housing 110 may have a slit G1, and the heat dissipating part 122 may pass through the slit G1 to extend out of the housing 110. In addition, the optical engine module 100 of this embodiment may further include a dust-proof member 150. The dust-proof member 150 is disposed between the slit G1 and the heat dissipating part 122. As such, the air tightness of the housing 110 can be improved to prevent dust from entering the housing 110 through the slit G1. In this embodiment, the dust-proof member 150 is for example, foam, sponge or rubber, but the scope of the invention is not limited thereto. Specifically, the dust-proof member 150 also has a slit G2, for example. During the installation process of the plate 120, for example, the dust-proof member 150 is first disposed in the slit G1 of the bottom wall 111, and then the heat dissipating part 122 of the plate 120 is inserted into the slit G2 of the dust-proof member 150, and then the fixing part 123 is fixed on the bottom wall 111, thereby completing the installation of the plate 120. As such, the plate 120 of this embodiment also has the advantage of being easy to install. In addition, the thickness of the heat dissipating part 122 of this embodiment may be between 0.3 mm and 0.4 mm, but the scope of the invention is not limited thereto. It should be noted that the shape of the plate 120 shown in FIGS. 1 to 3 is only an example. The detailed structure of the plate 120 can be changed according to actual requirements in other embodiments.

Please continue to refer to FIGS. 1 and 2. The optical engine module 100 of this embodiment may further include an optical prism 130. The surrounding side wall 112 further has a second opening O2. The optical prism 130 has a first surface S1 and a second surface S2 connected to each other. The first surface S1 faces to the first opening O1, and the second surface S2 faces to the second opening O2. The light receiving part 121 and the optical prism 130 are separated from each other to prevent the temperature of the optical prism 130 from rising rapidly due to contact with the light receiving part 121, thereby avoiding deviation of the optical path of the image beam Li. Similarly, the fixing part 123 of this embodiment is also separated from the optical prism 130.

In addition, the optical engine module 100 of this embodiment may further include a light valve 140. The light valve 140 is disposed at the second opening O2 of the housing 110. The light valve 140 of this embodiment is, for example, a digital micro-mirror device (DMD). The detailed features of the light valve 140 of other embodiments will be described in subsequent paragraphs, and no redundant detail is to be given herein. In this embodiment, the light valve 140 has a plurality of micro-mirrors (not shown). Each micro-mirror has an on-state and an off-state. The optical prism 130 may further have a third surface S3 connected between the first surface S1 and the second surface S2. The light valve 140 can receive an illumination beam L1, and the on-state micro-mirrors and the off-state micro-mirrors reflect the illumination beam L1 at different angles respectively, thereby forming the image beam Li and the off-state beam Ls, respectively. Specifically, as shown in FIG. 1, part of the illumination beam L1 is reflected by the on-state micro-mirrors to form the image beam Li, and the image beam Li is reflected from the third surface S3 of the optical prism 130 to the first opening O1. On the other hand, as shown in FIG. 2, part of the illumination beam L1 reflected by the off-state micro-mirrors forms the off-state beam Ls, and the off-state light Ls exits the third surface S3 of the optical prism 130 and is emitted to the off-state beam irradiation zone Z. The scope of the invention does not limit the specific position where the off-state beam Ls exits. It should be noted that in order to clearly distinguish the beams that have entered the optical prism 130 and the beams that do not enter the optical prism 130, the illumination beam L1 and the off-state beam Ls that have entered the optical prism 130 are shown in dotted lines in FIG. 2. In addition, the optical prism 130 of this embodiment is not provided with an ink coating; however, the optical prism 130 in other embodiments may be provided with an ink coating according to actual requirements to block part of the off-state beam Ls. In this embodiment, the shape of the optical prism 130 may be a triangular column, and the first surface S1, the second surface S2 and the third surface S3 may be the rectangular surfaces of the triangular column. The first surface S1 and the second surface S2 are substantially perpendicular to each other, and the third surface S3 can be an inclined surface of the triangular column.

Compared with the related art, the optical engine module 100 of this embodiment adopts a plate 120 having a light receiving part 121 and a heat dissipating part 122. The light receiving part 121 is located in the housing 110 of the optical engine module 100 and for allowing the off-state beam Ls to irradiate thereon. The heat dissipating part 122 extends out of the housing 110. In this way, the heat accumulated in the light receiving part 121 can be dissipated out of the housing 110 through the heat dissipating part 122, thereby improving the heat dissipation efficiency of the optical engine module 100.

Figure 4:
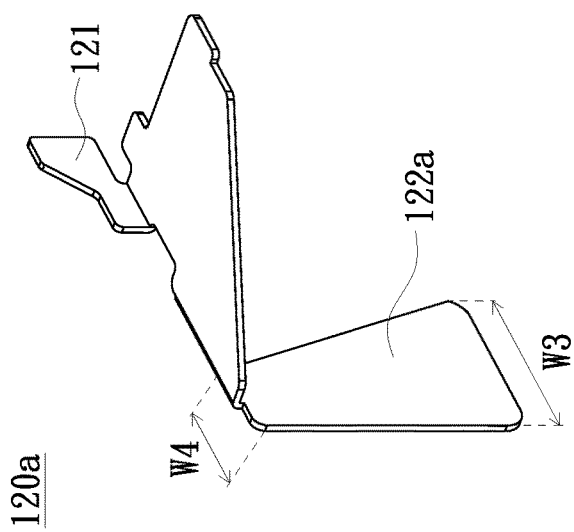
FIG. 4 is a schematic three-dimensional diagram of a plate of an optical engine module according to another embodiment of the invention.
Figure 5:
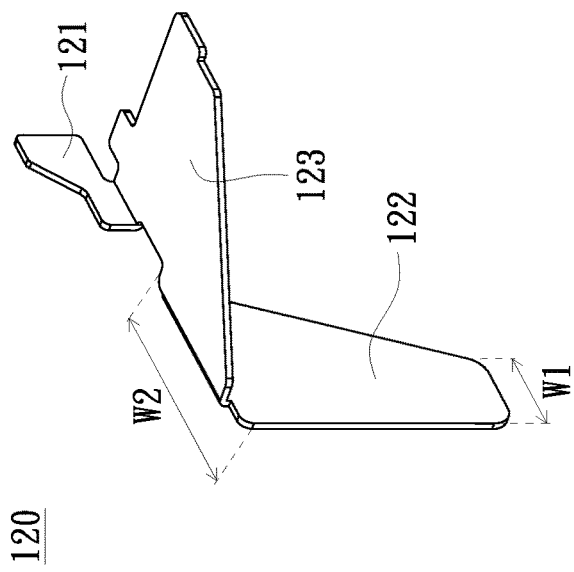
FIG. 5 is a schematic three-dimensional diagram of a plate of an optical engine module according to another embodiment of the invention.

It should be noted that because the heat dissipating part 122 of the plate 120 is located outside the housing 110, the size of the heat dissipating part 122 is not limited by the space in the housing 110, thereby further improving the heat dissipation efficiency. Specifically, in the embodiment of FIG. 3, the width W1 of the end of the heat dissipating part 122 away from the bottom wall 111 (shown in FIG. 1) may be smaller than the width W2 of the end of the heat dissipating part 122 close to the bottom wall 111. FIG. 4 is a schematic three-dimensional diagram of a plate of an optical engine module according to another embodiment of the invention. FIG. 5 is a schematic three-dimensional diagram of a plate of an optical engine module according to another embodiment of the invention. In the embodiment of FIG. 4, the width W3 of the end of the heat dissipating part 122a of the plate 120a away from the bottom wall 111 may be greater than the width W4 of the end of the heat dissipating part 122a close to the bottom wall 111. In addition, the heat dissipating part 122 may have different shapes according to different actual requirements. For example, the heat dissipating part 122, 122a in the embodiments of FIGS. 1 to 4 may include a heat dissipation plate, wherein the number of the heat dissipation plates is one, but the scope of the invention is not limited thereto. In other embodiments such as FIG. 5, the heat dissipating part 122b of the plate 120b may include a plurality of heat dissipation bars, and the number of the heat dissipation bars is not limited to that shown in FIG. 5. It should be understood that the shapes of the plates 120a and 120b shown in FIGS. 4 and 5 are only examples, and it is not required to that the scope be limited.

Figure 6:
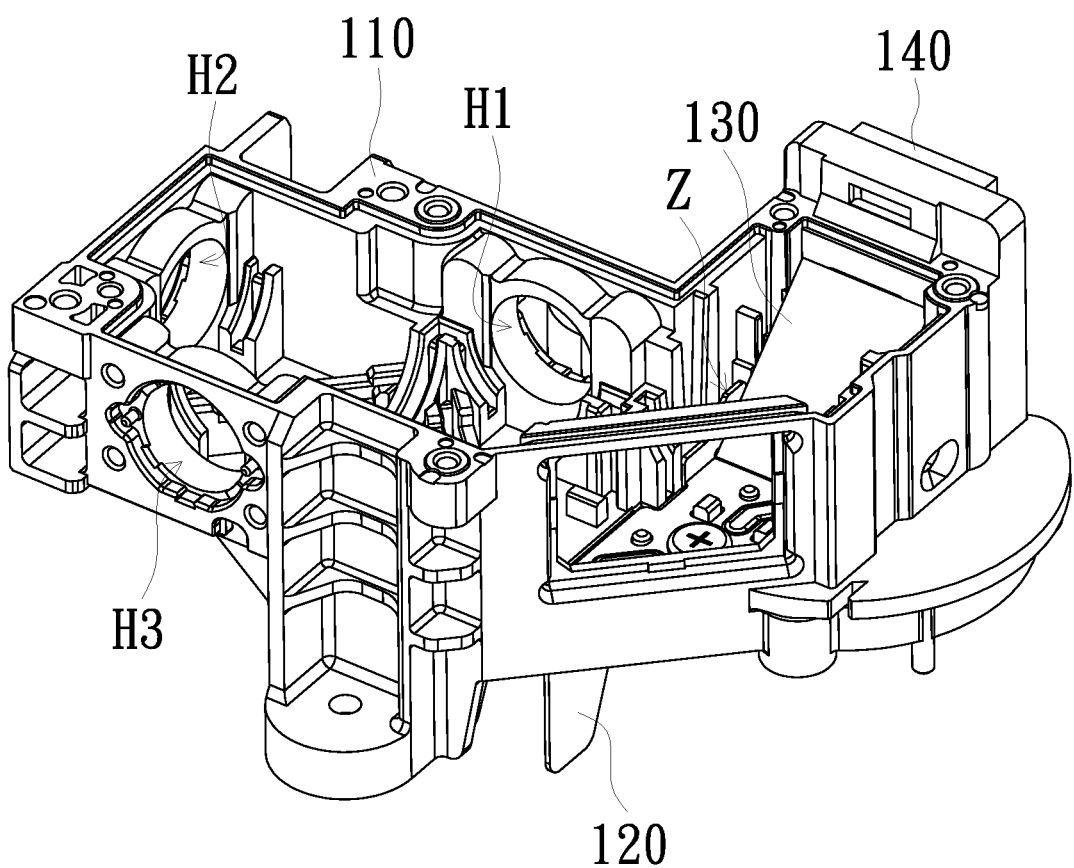
FIG. 6 is a schematic three-dimensional diagram of an implementation of the optical engine module of FIG. 1.
Figure 7:
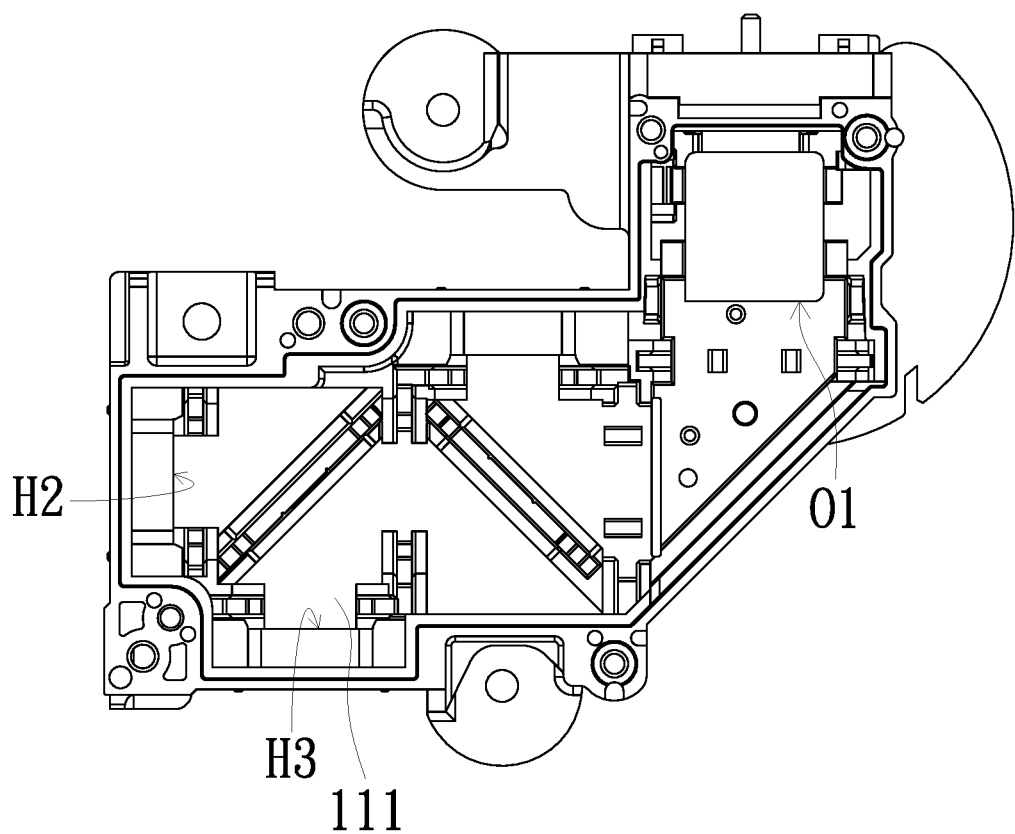
FIG. 7 is a schematic top view of the housing in FIG. 6.

FIG. 6 is a schematic three-dimensional diagram of an implementation of the optical engine module of FIG. 1. FIG. 7 is a schematic top view of the housing in FIG. 6. Please refer to FIGS. 6 and 7. The housing 110 of this embodiment may have beam entrance ports H1, H2 and H3 for allowing beams of different colors (e.g., green, blue and red beams) to enter. After entering the housing 110, the beams can be combined by a light combining element (not shown) to form the illumination beam L1 in FIG. 1, and then the illumination beam L1 is converted by the light valve 140 (shown in FIG. 6) into the image beams Li in FIG. 1 and the off-state beam Ls in FIG. 2. Similar to the embodiment of FIGS. 1 and 2, in the housing 110 shown in FIGS. 6 and 7, the image beam Li (shown in FIG. 1) exits through the first opening O1 of the bottom wall 111, and the off-state beam Ls (shown in FIG. 2) is incident on the off-state beam irradiation zone Z beside the first opening O1. It is understood that the housing 110 and the plate 120 shown in FIGS. 6 and 7 are only examples, and it is not required to that the scope be limited. For example, in other embodiments, the plate 120 can be replaced with the plate 120a or 120b, and the detailed structure of the housing 110 can also be different from that in FIGS. 6 and 7.

Figure 8:
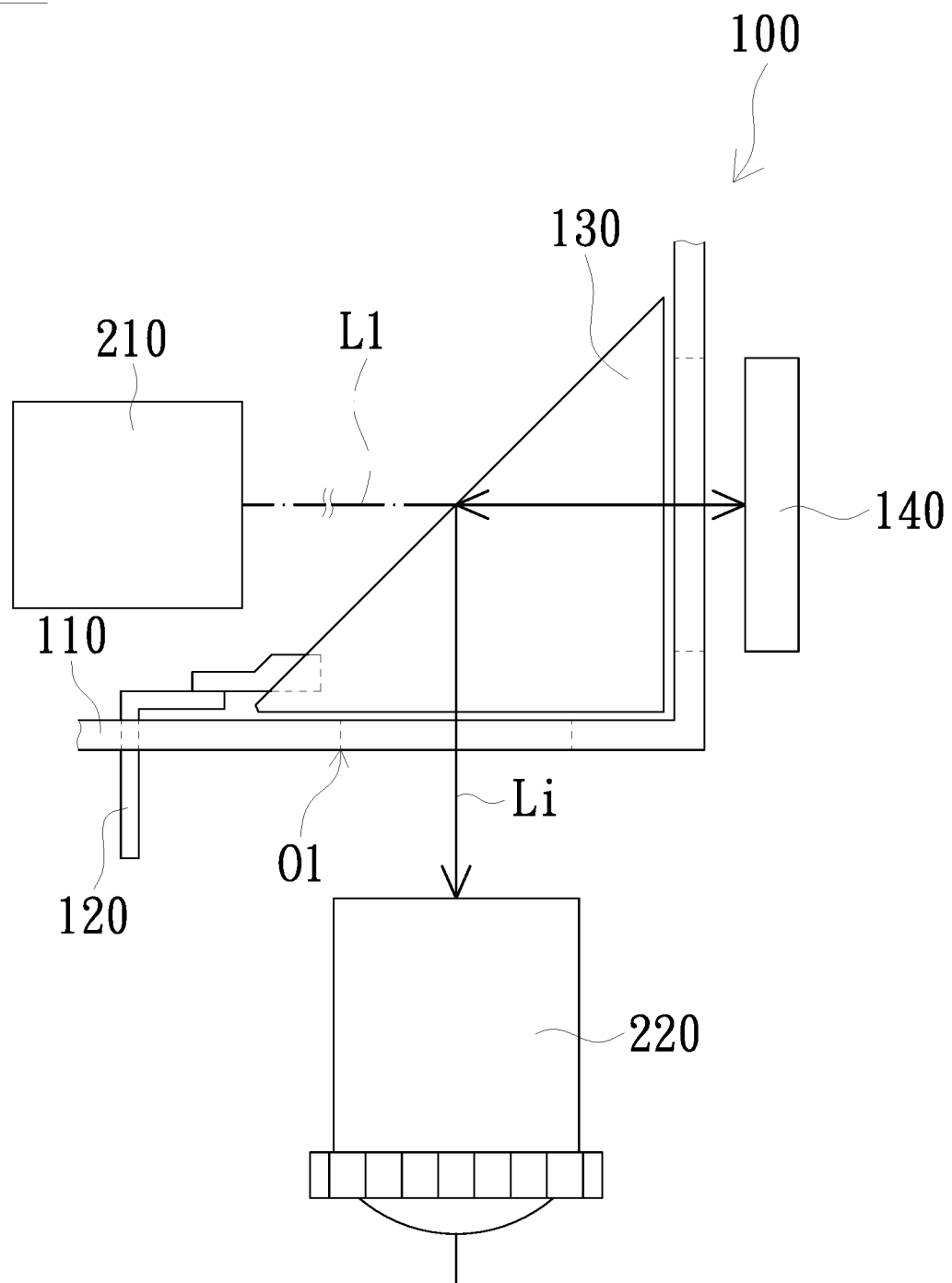
FIG. 8 is a schematic diagram of a projection device according to an embodiment of the invention.

FIG. 8 is a schematic diagram of a projection device according to an embodiment of the invention. Please refer to FIG. 8. The projection device 200 includes a light source 210, an optical engine module 100 and a projection lens 220. The light source 210 is configured to provide the illumination beam L1. The optical engine module 100 is disposed on the transmission path of the illumination beam L1 and is configured to generate the image beam Li. The projection lens 220 is disposed on the transmission path of the image beam Li and is configured to project the image beam Li.

The light source 210 of this embodiment may include an ultra-high pressure mercury lamp (UHP lamp), a xenon lamp, a light-emitting diode (LED) or a laser diode (LD). In addition, the number of the ultra-high pressure mercury lamp and xenon lamp is one, and the number of the light-emitting diodes or laser diodes can be one or more, for example. Specifically, the light-emitting diodes (or laser diodes) can be arranged in a matrix when the number of the light-emitting diodes (or laser diodes) is multiple.

As described above, the optical engine module 100 may further include a light valve 140. The light valve 140 of this embodiment is a digital micro-mirror element, but the scope of the invention is not limited thereto. In other embodiments, the light valve 140 may be a liquid crystal on silicon (LCoS) or a liquid crystal display (LCD). In addition, this embodiment does not limit the number of light valves 140. In other embodiments, the optical engine module 100 may adopt a structure of single-chip liquid crystal display panel or three-chip liquid crystal display panel, but the scope of the invention is not limited thereto.

The projection lens 220 of this embodiment includes, for example, one or more optical lenses, and the diopter of the optical lenses may be the same or different from each other. For example, the optical lens may include various non-planar lenses such as biconcave lenses, biconvex lenses, meniscus lenses, convex-concave lenses, plano-convex lenses, and plano-concave lenses, or any combination of the above-mentioned non-planar lenses. On the other hand, the projection lens 220 may also include a flat optical lens. It is not required that the projection lens 220 be limited.

Compared with the related art, the projection device 200 of this embodiment has good reliability due to adopting the above-mentioned optical engine module 100.

In summary, the optical engine module of the invention adopts a plate having a light receiving part and a heat dissipating part; the light receiving part is located in the housing of the optical engine module and for allowing the off-state beam to irradiate thereon; and the heat dissipating part extends out of the housing. In this way, the heat accumulated in the light receiving part can be dissipated out of the housing through the heat dissipating part, thereby improving the heat dissipation efficiency of the optical engine module. On the other hand, the projection device of the invention has improved reliability due to adopting the aforementioned optical engine module.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first opening, the second opening, the first surface and the second surface are only used for distinguishing various elements and do not limit the number of the elements.

What is claimed is:

1. An optical engine module used for a projection device and configured to generate an image beam, the optical engine module comprising:
   a housing, having a surrounding side wall and a bottom wall connected to each other, wherein the bottom wall has a first opening configured to allow the image beam to exit, and the surrounding side wall has a second opening;
   an optical prism, having a triangular column shape, wherein the optical prism comprises:
      a first surface facing to the first opening and a second surface facing to the second opening, wherein the first surface and the second surface are connected and perpendicular to each other, and
      a third surface connected and located between the first surface and the second surface, and being an inclined surface of the triangular column;
   a plate, having a light receiving part and a heat dissipating part, wherein the light receiving part is located between a surface of the optical prism and the surrounding side wall, the surface of the optical prism is connected to the first surface, the second surface and the third surface, the light receiving part is configured to be irradiated by an off-state beam, and the heat dissipating part passes through the bottom wall from an inside of the housing, and extends out of the housing in a direction away from the bottom wall;
   wherein the off-state beam is configured to leave from the third surface of the optical prism and at least a part of the off-state beam is configured to directly irradiate to the light receiving part;
   wherein in a normal direction of the bottom wall, an orthogonal projection of the light receiving part on the bottom wall is not overlapped with the first opening of the bottom wall.

2. The optical engine module according to claim 1, wherein the heat dissipating part comprises a heat dissipation plate or a plurality of heat dissipation bars.

3. The optical engine module according to claim 1, wherein a width of an end of the heat dissipating part far away from the bottom wall is greater than or less than a width of an end of the heat dissipating part close to the bottom wall.

4. The optical engine module according to claim 1, wherein the light receiving part and the optical prism are separated from each other.

5. The optical engine module according to claim 1, further comprising a light valve disposed at the second opening of the housing.

6. The optical engine module according to claim 1, further comprising a dust-proof member, wherein the bottom wall has a slit for allowing the heat dissipating part to pass therethrough, and the dust-proof member is disposed between the slit and the heat dissipating part.

7. The optical engine module according to claim 1, wherein the plate further comprises a fixing part connecting the light receiving part and the heat dissipating part, and the fixing part is fixed on the bottom wall.

8. A projection device, comprising a light source, an optical engine module and a projection lens, the light source being configured to provide an illumination beam, the optical engine module being disposed on a transmission path of the illumination beam and configured to generate an image beam, the projection lens being disposed on a transmission path of the image beam and configured to project the image beam, and the optical engine module comprising:
  a housing, having a surrounding side wall and a bottom wall connected to each other, wherein the bottom wall has a first opening configured to allow the image beam to exit, the surrounding side wall has a second opening, the projection lens is configured to receive the image beam emitted from the first opening, and the light source is configured to provide the illumination beam into the housing;
  an optical prism, having a triangular column shape, wherein the optical prism comprises:
    a first surface facing to the first opening and a second surface facing to the second opening, wherein the first surface and the second surface are connected and perpendicular to each other, and
    a third surface connected and located between the first surface and the second surface, and being an inclined surface of the triangular column;
  a plate, having a light receiving part and a heat dissipating part, wherein the light receiving part is located between a surface of the optical prism and the surrounding side wall, the surface of the optical prism is connected to the first surface, the second surface and the third surface, the light receiving part is configured to be irradiated by an off-state beam, and the heat dissipating part passes through the bottom wall from an inside of the housing, and extends out of the housing in a direction away from the bottom wall;
  wherein the off-state beam is configured to leave from the third surface of the optical prism and at least a part of the off-state beam is configured to directly irradiate to the light receiving part;
  wherein in a normal direction of the bottom wall, an orthogonal projection of the light receiving part on the bottom wall is not overlapped with the first opening of the bottom wall.

9. The projection device according to claim 8, wherein the heat dissipating part comprises a heat dissipation plate or a plurality of heat dissipation bars.

10. The projection device according to claim 8, wherein a width of an end of the heat dissipating part far away from the bottom wall is greater than or less than a width of an end of the heat dissipating part close to the bottom wall.

11. The projection device according to claim 8, wherein the light receiving part and the optical prism are separated from each other.

12. The projection device according to claim 8, wherein the optical engine module further comprises a light valve disposed at the second opening of the housing.

13. The projection device according to claim 8, wherein the optical engine module further comprises a dust-proof member, the bottom wall has a slit for allowing the heat dissipating part to pass therethrough, and the dust-proof member is disposed between the slit and the heat dissipating part.

14. The projection device according to claim 8, wherein the plate further comprises a fixing part connecting the light receiving part and the heat dissipating part, and the fixing part is fixed on the bottom wall.

* * * * *